United States Patent
Kemp et al.

(10) Patent No.: US 7,858,868 B2
(45) Date of Patent: Dec. 28, 2010

(54) METHOD FOR CLASSIFYING MUSIC USING GISH DISTANCE VALUES

(75) Inventors: Thomas Kemp, Esslingen (DE); Marta Tolos, Vilassar de Mar (ES)

(73) Assignee: Sony Deutschland GmbH, Cologne (DE)

( * ) Notice: Subject to any disclaimer, the term of this patent is extended or adjusted under 35 U.S.C. 154(b) by 609 days.

(21) Appl. No.: 11/631,944

(22) PCT Filed: Jul. 8, 2005
(Under 37 CFR 1.47)

(86) PCT No.: PCT/EP2005/007403
§ 371 (c)(1),
(2), (4) Date: Feb. 15, 2008

(87) PCT Pub. No.: WO2006/005533
PCT Pub. Date: Jan. 19, 2006

(65) Prior Publication Data
US 2009/0031882 A1 Feb. 5, 2009

(30) Foreign Application Priority Data
Jul. 9, 2004 (EP) .................................. 04016229

(51) Int. Cl.
*G10H 1/00* (2006.01)
*G10H 1/18* (2006.01)
*G10H 7/00* (2006.01)

(52) U.S. Cl. ........................................................ 84/615
(58) Field of Classification Search .................. 84/609, 84/615
See application file for complete search history.

(56) References Cited

U.S. PATENT DOCUMENTS
2005/0160449 A1 7/2005 Goronzy et al.

OTHER PUBLICATIONS

George Tzanetakis, et al., "Musical Genre Classification of Audio Signals", IEEE Transactions on Speech and Audio Processing, vol. 10, No. 5, XP 002307404, pp. 293-302, 2002.
Thomas Kemp, et al., "Strategies for Automatic Segmentation of Audio Data", Interactive Systems Laboratories, vol. 3, No. 5, XP 010507616, pp. 1423-1426, 2000.
A. Solomonoff, et al., "Clustering Speakers by Their Voices", Acoustics, Speech and Signal Processing, XP 010279341, pp. 757-760, 1998.

(Continued)

*Primary Examiner*—Jeffrey Donels
(74) *Attorney, Agent, or Firm*—Oblon, Spivak, McClelland, Maier & Neustadt, L.L.P.

(57) ABSTRACT

A method for classifying music includes providing music classification data, providing an unclassified piece of music to be classified, and deriving for each music class within the music classification data a respective Gish distance value. A finite set of a finite number of Gish distance values is descriptive for the relation of the unclassified piece of music to be classified with respect to a discrete and finite set of a finite number of music classes. Alternatively, for a given piece of music to be classified, music classification data of a n-tuple of at least three numbers are obtained, which are representative for the mood of the piece of music. From the n-tuple of numbers of the music classification data a pair of two dimensional coordinate values are determined, which are representative for the mood of the piece of music.

43 Claims, 3 Drawing Sheets

OTHER PUBLICATIONS

T. Lambrou, et al., "Classification of Audio Signals Using Statistical Features on Time and Wavelet Transform Domains", Acoustics, Speech and Signal Processing, XP 010279671, pp. 3621-3624, 1998.

Yibin Zhang, et al., "A Study on Content-Based Music Classification", ISSPA, vol. 2. No. 1, XP 010653316, pp. 113-116, 2003.

Beth Logan, "MEL Frequency Cepstral Coefficients for Music Modeling", Proceedings Annual International Symposium on Music Information Retrieval, XP 002289783, pp. 1-11, 2000.

Dan Liu, et al., "Automatic Mood Detection from Acoustic Music Data", in proceedings ISMIR 2003, Baltimore, MD., 7 pages.

U.S. Appl. No. 12/369,352, filed Feb. 11, 2009, Kemp.

U.S. Appl. No. 12/593,927, filed Sep. 30, 2009, Kemp.

H — Happy
A — Aggressive
S — Sad

METHOD FOR CLASSIFYING MUSIC USING GISH DISTANCE VALUES

The present invention relates to a method for classifying music. The present invention particularly relates to a method for automatic music mood detection.

In recent years so-called mobile music players arose which are capable of offering the comparable large amount of music or a comparable large number of music pieces because of their still increasing storage capabilities which allow for the storage of a very large number of storage items. However, these mobile music players are sometimes inconvenient with respect to the selection and classification processes with respect to the stored music pieces. Some-times, the classification and/or the election process for music pieces to be made by the user of such a mobile music player become difficult.

It is therefore an object of the present invention to provide a method for classifying music which is capable of reliably providing a classification of unclassified pieces of music in an easy manner.

The object is achieved by a method for classifying music according to a first solution according to independent claim 1 and according to a second solution according to independent claim 31. Preferred embodiments of the inventive method for classifying music are within the scope of the dependent sub-claims. The object is further achieved by a system for classifying music, by a respective computer program product as well as by a computer readable storage medium according to claims 41, 42, and 43, respectively.

The method for classifying music according to the present invention according to a first solution of the object comprises steps of (a) providing music classification data which are descriptive for discrete and finite set of a finite number of music classes, of (b) providing an unclassified piece of music to be classified, and of (c) deriving for each of said music classes of said set of music classes a respective Gish distance value with respect to said unclassified piece of music to be classified, thereby obtaining a discrete and finite set of a finite number of Gish distance values, wherein said finite set of a finite number of Gish distance values is descriptive for the relation of said unclassified piece of music to be classified with respect to said discrete and finite set of a finite number (n) of music classes.

Additionally, a further step (d) may be included according to which within said set of Gish distance values at least one minimum Gish distance value is determined and thereby determining the distinct minimizing music class within said set of music classes which corresponds to said minimum Gish distance value.

Further, a step (e) of selecting said minimizing music class as a characteristic class for said unclassified piece of music to be classified may be included.

It is therefore a key idea of the present invention to derive respective Gish distance values with respect to said unclassified piece of music from the provided music classes and to obtain from the thereby collected set of Gish distance values.

Additionally, the minimum Gish distance value and thereby the distinct characteristic class characterizing the unclassified piece of music in the form of a music class which minimizes the Gish distance values may preferably be obtained.

According to a preferred embodiment of the present invention the Gish distance values are calculated according to equation (1).

$$Dj := D(s, cj) \tag{1}$$

$$\stackrel{\text{def}}{=} \log\left(\frac{L(s \mid m(s)) \cdot L(cj \mid m(cj))}{L(s + cj \mid m(s + cj))}\right)$$

with $j=1, \ldots, n$. In equation (1) s denotes the unclassified piece of music to be classified or a part thereof. The expression + denotes an operation of concatenation of the respective pieces of music or of parts thereof. The expression $cj$ for $j=1, \ldots, n$ denotes the respective music class or a representative or a part of a representative thereof. The expression $m(\cdot)$ denotes a respective model or a model building operation with respect to the respective piece of music. The expression $L(x|y)$ denotes the likelihood to observe a piece of music x, a data set x or a part x thereof when a model y is given.

It is preferred to use Gaussian density models as models $m(\cdot)$.

Preferably, only one single full covariance Gaussian density is employed.

Additionally or alternatively multi-variate models may be used as models $m(\cdot)$.

According to a preferred and advantageous embodiment of the present invention said step (a) of providing said music classification data is or comprises a process of receiving and/or generating said music classification data or a part thereof or a part of said process.

In addition or as an alternative, said step (b) of providing an unclassified piece of music to be classified may comprise a process of receiving said unclassified piece of music to be classified or a part thereof or a part of said process, in particular from an external source.

Said music classification data and/or the models $m(\cdot)$ may be based on complete songs or complete music pieces or on characteristic parts thereof.

It is of further advantage to have said step (c) of deriving said Gish distance values and/or said step (d) of detecting said minimum Gish distance value be build or contain a process of comparing said unclassified piece of music to be classified or said respective part thereof with respect to a plurality or with respect to the entity of music classes and to thereby locate said unclassified piece of music or said respective part thereof within a mood space defined by said music classification data and in particular defined by said music classes.

According to a further advantageous embodiment of the present invention the inventive method for classifying music comprises a step (f) of providing song classification data which are descriptive for the relationship of said unclassified piece of music to be classified to said music classes or the respective part thereof and to thereby classify the unclassified piece of music or the respective part thereof with respect to said music classes.

According to a further preferred embodiment of the present invention the music pieces and/or the parts thereof may be sampled.

In this case a sampling frequency of about 22 kHz may be used.

Further, the music pieces and/or the parts thereof may be cut into frames.

In this case a frame length of about 32 ms may be used.

Additionally or alternatively, a frame rate of about 50 ms may be used. Additionally or alternatively, each frame may be hamming windowed before the computation of respective FFTs.

According to a further preferred and advantageous embodiment, from the respective FFTs the respective power spectrum may be derived and the respective power spectral vectors may be used as a basis for the computation of feature vectors.

In this case the feature vectors may be melscale warped.

Preferably, 30 melscale coefficients may be used.

Further on, said melscale coefficients may be logarithmized.

In this case said logarithmized melscale coefficients may be subjected to an inverse discrete Fourier transform.

From said inverse discrete Fourier transform of said logarithmized melscale coefficients a set of—in particular 13—cepstral coefficients per frame may be derived.

From said set of cepstral coefficients per frame one or an arbitrary plurality of the spectral centroid, spectral flux, and the spectral roll off may be computed.

Variances of said spectral centroid, of said spectral flux, and/or of said spectral roll off may be computed.

In this case, said variances of said spectral centroid, of said spectral flux, and/or of said spectral roll off may be computed over a window of Q adjacent frames, wherein in particular Q ranges from 5 to 20.

Advantageously, said variances are taken as parameters.

According to a further preferred embodiment based on said set of Gish distance values music classification data for said piece of music to be classified or for said part thereof are derived, in particular in the form of an n-tuple of at least three numbers.

A further advantageous embodiment of the first inventive method comprises steps of (f) obtaining/providing for a given piece of music to be classified, music classification data in the form of a n-tuple of at least three numbers which are representative for the mood of said piece of music or of said part thereof, and of (g) determining from said n-tuple of numbers of said music classification data a pair of two dimensional coordinate values are determined which are representative for the mood of said piece of music or of said part thereof.

The method for classifying music according to the present invention according to a second solution of the object comprises steps of (f) obtaining/providing for a given piece of music to be classified, music classification data in the form of a n-tuple of at least three numbers which are representative for the mood of said piece of music or of said part thereof, and of (g) determining from said n-tuple of numbers of said music classification data a pair of two dimensional coordinate values are determined which are representative for the mood of said piece of music or of said part thereof.

Additionally or alternatively, Cartesian coordinates and/or polar coordinates may be used as two-dimensional coordinate values.

Further triples of numbers may be used as said n-tuples of numbers.

Preferably, said triples of numbers are formed by three mood values for said piece of music or said part thereof.

In this case, said mood values are chosen to classify the moods "happy", "sad" and "aggressive", respectively, with respect to said piece of music (s) or said part thereof.

In a preferred embodiment of the inventive method Cartesian coordinates as two-dimensionally coordinate values are determined according to:

$$x = j \cdot \cos(\pi/6) - s \cdot \cos(\pi/6) \quad (1a)$$

$$y = \alpha - j \cdot \sin(\pi/6) - s \cdot \sin(\pi/6) \quad (1b)$$

wherein x, y denote said first and second Cartesian coordinate values respectively and wherein j, s, a denote said first, said second, and said third numbers, respectively, of said music classification data for said piece of music or said part thereof, in particular in normalized form and further in particular with respect to said moods "happy", "sad", and "aggressive", respectively.

According to another embodiment of the inventive method polar coordinates as two-dimensional coordinate values are determined according to $$r = \sqrt{x^2 + y^2} \quad (2a)$$

$$\phi = \frac{1}{2\pi} \cdot \arctan(y/x) \quad (2b)$$

wherein r, φ denote the polar radial and the polar angular coordinate values, respectively, and wherein x, y denote two-dimensional Cartesian coordinate values, in particular according to equations (1a), (1b).

From two-dimensional coordinate values, in particular in normalized form, a color or color values describing a color may be generated which are descriptive for the mood of said piece of music or said part thereof.

In this case, the color and/or the color values may be determined according to the HSV system.

In particular wherein the color and/or the color values may be determined according to the HSV system by $$h = \phi, \quad (3a)$$

$$s = r, \quad (3b)$$

$$v = 1,0, \quad (3c)$$

wherein h, s, v denote the HSV color values hue, saturation, and value, respectively, and wherein r, φ denote the two-dimensional polar radial and polar angular coordinate values, respectively, in particular according to equations (2a), (2b).

According to a further aspect of the present invention a system for classifying music is provided which is adapted and/or arranged and which comprises means in order to realize the method for classifying music according to the present invention and the steps thereof.

According to a further aspect of the present invention a computer program product is provided comprising computer program means which is arranged and/or adapted in order to realize the method for classifying music according to the present invention or the steps for classifying music according to the present invention when it is executed on a digital signal processing means or on a computer.

A still further aspect of the present invention is to provide a computer read-able storage medium which comprises the inventive computer program product.

In the following, these and further aspects of the present invention will become more clear by taking reference to the following remarks:

The present invention in particular relates to a method and to a device for automatic music mood detection.

With the advent of mobile music players that offer a huge storage capacity for very many music pieces, but have a form factor and size that does not allow for the inclusion of a screen or a keyboard, the problem of music selection becomes more and more important. In many surveys, users have shown a preference to use their mood, or the mood of music, as a selection criterion for the selection of music. Mood in music, however, is a concept that so far needed manual tagging which is extremely cumbersome and expensive if performed on a large scale. We propose a system that can automatically determine the mood in any piece of music and assign a mood label to music automatically.

Most attempts to automatically derive mood from music have been limited to symbolic data (e.g. MIDI representations of music). However, most music is not available in symbolic form, and thus the usability of this approaches is very limited. Dan Liu, Lie Lu and Hong-Jiang Zhang from Microsoft Research have created the only (to our knowledge) such system, which is working on classical music. Their system, as compared to ours, is using Thayer's model of mood and uses a hierarchical structure, which makes it impossible for the user to adapt the already trained system, and also makes it very difficult to introduce new mood categories [1].

There is currently no fast and reliable way to choose a song out of a large collection (database) of songs. Hierarchical, list selection based methods based on the graphical select-and-click paradigm require several basic operations and are cumbersome, while voice command selection is direct and easy, but suffers from high speech recognition error rates. Additionally, in many cases there is a strong user interest in exploring a given database for new music experience, which cannot be realized with any selection paradigm where a known piece of music is selected.

It is the goal of the current invention to facilitate an easy and intuitive way to browse a musical database and select songs from it, without the need for expensive and time consuming manual metadata creation for the songs in the database.

The system that can automatically determine musical mood can be decomposed into three subsystems: selection of the learning set, creation of the mood models, and the determination of mood for a given music which makes use of the precomputed mood models. The main inventive step is in the third subsystem, with some additional relevant and novel extensions in the first subsystem.

In the first subsystem, a learning set which is representative for the mood is selected. In the easiest form, this can be done by selecting a few music pieces for each desired mood category. For example, if three mood categories [happy, aggressive, sad] are desired, this can be done by selecting a number (e.g. N=10) of songs for each of the three categories: 10 happy songs, 10 sad songs, and 10 aggressive ones. In the easiest scheme, this is all that is needed. However, taking the entire song as a representative for a given mood can be misleading. For example, many songs are categorized as aggressive although parts of them—in many cases the beginning—are rather sad, but only the main part is (chorus part, or most representative part in terms of average similarity the remainder of the song, or the part which contains the vocals). Therefore, it is advantageous to extract only a part from the songs in order to create the mood model, rather than taking the entire song. However, if such a scheme is realized, it is important to use the same scheme in the third sub-system where the unknown song is compared to the mood models; therefore, only automatic means for the extraction of the relevant part of the song can be used. Particularly, a system which extracts the relevant part of music has been described in an earlier patent application from SSG, and the teaching of this invention can be utilized for this purpose. In another subclaim, it should be noted that the selection of the music pieces for each of the emotions will ultimately determine the way the total system will behave, and therefore, this selection can be accessed by the user for adaptation of the system to his personal taste. In such a scenario, a user can e.g. add a song to any of the categories, and the system will then retrain the models. This allows the user to realize his or her own perceptions of mood into the system (user adaptation), without the need to change the architecture of the system in any way.

The second of the three subsystems computes mood models from the previously identified sets of fragments of music (which could be, depending on the exact method utilized in the first subsystem, parts of, or entire music pieces which have been handpicked by the system developer or the user). The music is sampled—a sampling frequency of 22 kHz has proven to be sufficient, so if the storage should be reduced, a 44.1 kHz stereo piece can be downsampled to 22 kHz and the stereo channels combined into one mono channel—and cut into frames of 32 ms length with a frame rate of 50 ms. Of course, other frame rates and frame lengths could be used. Each frame is hamming windowed and the FFT is computed. From the FFT, the power spectrum is derived. This power spectral vectors serve as the basis for the computation of the feature vectors. Firstly, like in speech recognition, they are melscale warped (see the relevant literature) into 30 melscale coefficients, logarithmized, and the inverse DFT transform is computed resulting in a set of 13 cepstral coefficients per frame. Secondly, the spectral centroid, spectral flux, and spectral roll off are computed, and their variance over a window of Q adjacent frames is taken as a parameter, where typical values of Q range from 5 to 20. Spectral centroid, spectral flux and spectral roll off are all explained in [2].

For each of the classes (sad, happy, etc), the so computed parameter vectors are taken and one single full covariance Gaussian density is computed in a maximum likelihood style from it. The resulting normal distribution serves as the mood model for the third of the three subsystems of the mood identifier.

The third of the three subsystems takes the set of the mood models (which are multivariate Gaussian densities each) and an unknown piece of music and computes the mood of the unknown piece of music by comparing the similarity of each of the mood models with a mood model derived from the unknown piece of music. To achieve this, the unknown piece of music is first treated as the training set music in the first two subsystems: if applicable, the most relevant part of it is extracted in the first subsystem, then the preprocessing is done in the second subsystem and a multivariate Gaussian density is computed in the third subsystem. The result is a multivariate Gaussian density for the unknown song. Using this model, and the pre-computed mood models, the distance between the unknown model and a mood model is computed using the so called Gish distance D:

$$D(s1, s2) \stackrel{def}{=} \log\left(\frac{L(s1 \mid m(s1)) \cdot L(s2 \mid m(s2))}{L(s1 + s2 \mid m(s1 + s2))}\right). \quad (2)$$

Where the expression $L(sX|m(sX))$ denotes for $X=1, 2$, the likelihood to observe a data sequence $sX$ for a given multivariate Gaussian density model $m(sX)$ for $sX$. The expression $m(s1+s2)$ denotes a model that is created for the concatenation of songs or pieces of music or sound $s1$ and $s2$. The expression $s1+s2$ denotes the concatenation of the songs or pieces of music or sound $s1$ and $s2$. If equation (2) is computed for single Gaussian normal densities m or single Gaussian normal density models m like proposed so far, then there is an efficient formulation where there is no need to store the songs or pieces of music or sound $s1$ and $s2$ when $s1$ is the unknown song and $s2$ is the con-catenation of all relevant sections or songs of the training set songs for the current mood. Of course it is possible to use other models to compute the terms in equation (2). However, in this case the evaluation of the formula is significantly heavier.

After equation (2) has been evaluated for all mood models, the lowest of the three resulting distances is selected and the mood model that gave rise to this lowest distance is selected as the tentative mood of the music piece. It is also possible, and very useful, to build a normalized vector from the distances to the mood models. From, e.g., three moods, the resulting three dimensional vectors give a coordinate in a "mood space" which can be used for navigating and locating a song using one or several mood axis. The resulting space is highly non uniformly populated, the individual dimensions are far from independent, and therefore it is advantageous to compute a variance normalizing and diagonalizing transformation (a PCA, or Karhunen-Loewe transform) in the target space, using a large test set of songs to compute the transformation. After the coordinate transform, the resulting space can be adequately used for navigation in the mood space of music. Still, it must be kept in mind that the Euclidean distance even in the transformed space is not a metric since it does not always satisfy the triangle inequality due to the properties of the Gish distance of equation (2).

The proposed invention allows the automatic generation of music mood tags with a very high quality in relatively little time and with moderate computing resources. The system can be extended to focus on parts of the music only, and a personalization to individual concepts of mood is easy so that individual differences in the perception of any given piece of music can be coped with. A mood space can be automatically constructed which allows to locate songs inside the mood space and which consequently can be used for music selection.

Problem:

To translate provided song mood data—at least three in particular unbounded, unsigned numbers for each song—into a linear visual interface.

Outline of Solution:

From the "library" (the collection of songs) three "mood" values are imported for each song; the values are internally referred to as "happy", "sad" & "aggressive". These values are normalized based on the maximum & minimum values in the library, so each has a value of [0.0-1.0] and stored in a data-base.

Each song is then mapped onto a color by conversion of the three "mood" values first into Cartesian co-ordinates, and then from Cartesian co-ordinates to polar co-ordinates.

Conversion from song "mood" values to Cartesian co-ordinates is done using the following formulae $x = j \cdot \cos(\pi/6) - s \cdot \cos(\pi/6)$ and $y = \alpha - j \cdot \sin(\pi/6) - s \cdot \sin(\pi/6)$, where: "x" is horizontal co-ordinate, "y" is vertical co-ordinate, "j" is song "happy" value, "s" is song "sad" value, "a" is the song "aggressive" value.

Conversion from Cartesian polar co-ordinates is done using the following (standard) formulae $$r = \sqrt{x^2 + y^2}$$

and $$\phi = \frac{1}{2\pi} \cdot \arctan(y/x),$$

where: "r" is radial, "φ" is angle in radians, "x" is horizontal co-ordinate, "y" is vertical co-ordinate.

The radial value is normalized across the library to the range [0.0-1.0]. This normalized polar co-ordinate is then mapped to a color using the HSV color system. The HSV color system defines a color by 3 values; these values are Hue [0.0-1.0], Saturation [0.0-1.0] & Value [0.0-1.0].

The values colour is determined by the following formulae $h=\phi$, $s=r$, and $v=1, 0$, where: "h" is hue, "s" is saturation, "v" is value, "r" is radial, "φ" is angle in radians.

SUMMARY

By mapping the three "mood" values of songs into two dimensions, then into a color space it is possible to navigate the song library by hue (i.e. song "mood") and saturation (i.e. song "mood" strength). A more saturated color indicates a song with a strong strength of a particular "mood". It also allows the user to navigate the library in a simple manner using an interface which employs just 2 input values.

These and further aspects of the present invention are further discussed by taking reference to the accompanying figure.

Figure 1:
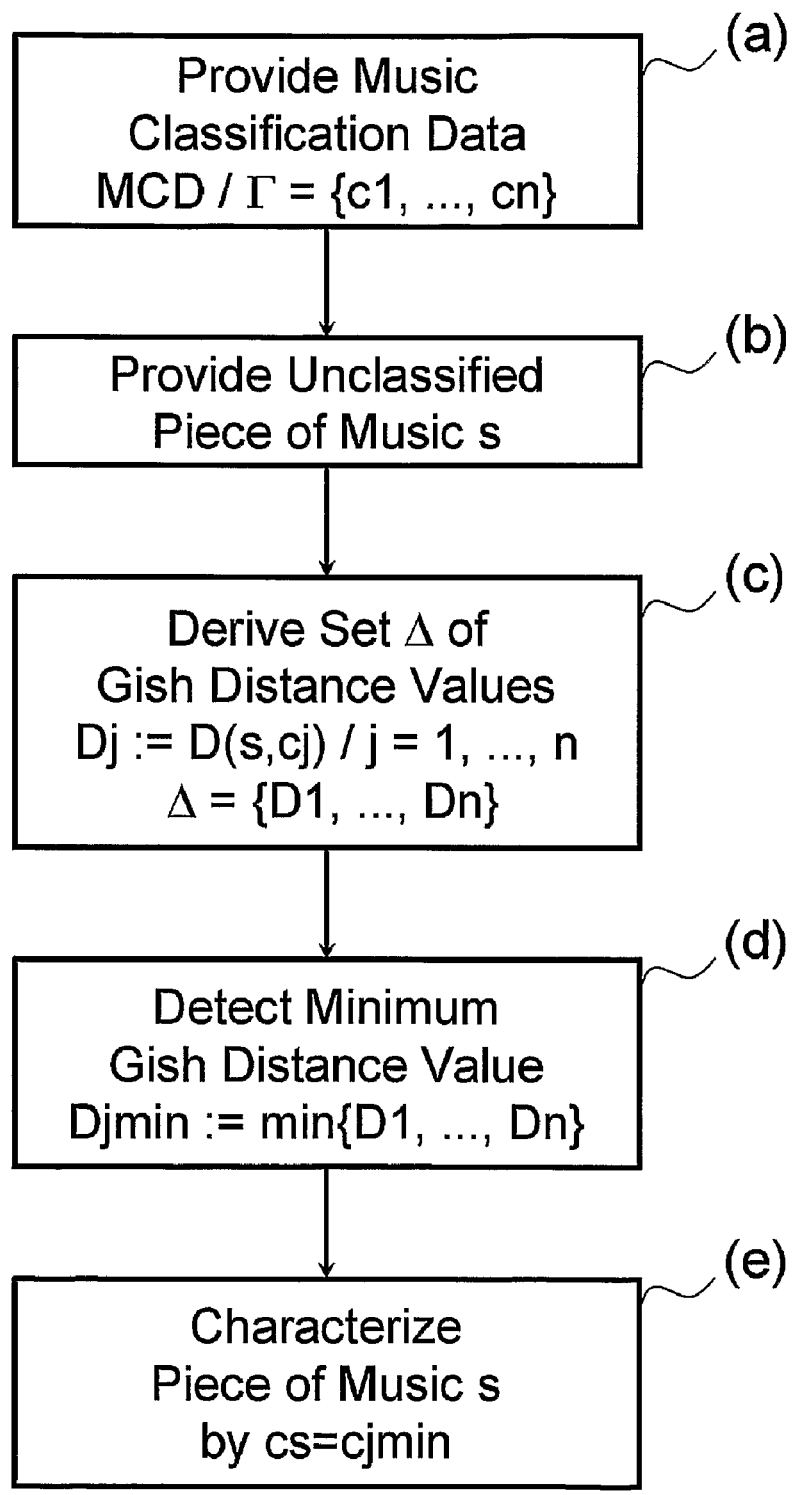
FIG. 1 is a flow chart which describes some essential features of a preferred embodiment of the present inventive method for classifying music.

The schematically described embodiment of the inventive method for classifying music of FIG. 1 comprises first to fifth consecutive processing steps (a) to (e).

In the first step (a) music classification data MCD are provided. These music classification data may be—at least in part—given by a set r of music classes cl, . . . , cn. In the simplest case these music classes cl, . . . , cn may be sample pieces of music each of which being an example for a distinct musical mood or musical class. Said music classification data may also be based on an narrow evaluation and classification process with respect to the sample pieces or with respect to the given classes cl, . . . , cn. This narrow evaluation has already been described above.

In the following second step (b) an unclassified piece of music s which has to be classified by the inventive method for classifying music is provided.

Based on this unclassified piece of music s in the following third step (c) a set of Γ of Gish distance values Dj: =D(s,cj) for j=1, . . . , n is derived: Γ: {D1, . . . , Dn}.

In the following fourth step (d) the minimum Gish distance value Djmin is detected as the minimum of the set Γ: Djmin:= min{D1, . . . , Dn}.

Finally, in the fifth step (e) the distinct music class cjmin is detected and selected as the characterizing class cs for the unclassified piece of music s to be classified. cjmin is the distinct class from the set Γ of music classes cl, . . . , cn for which the minimum Gish distance value Djmin is obtained. The unclassified piece of music s can be referred to as the next neighbor of the distinct classifying music class cjmin or vice versa. It may be also possible that the unclassified piece of music s is classified by a subset of Γ containing a certain number of next neighbors on the basis of a respective threshold condition for the detected Gish distance values. In such a case the characterization on the basis of a plurality of music classes may be more elaborated and may contain a better information and classification for the piece of music s to be classified.

Figure 2:
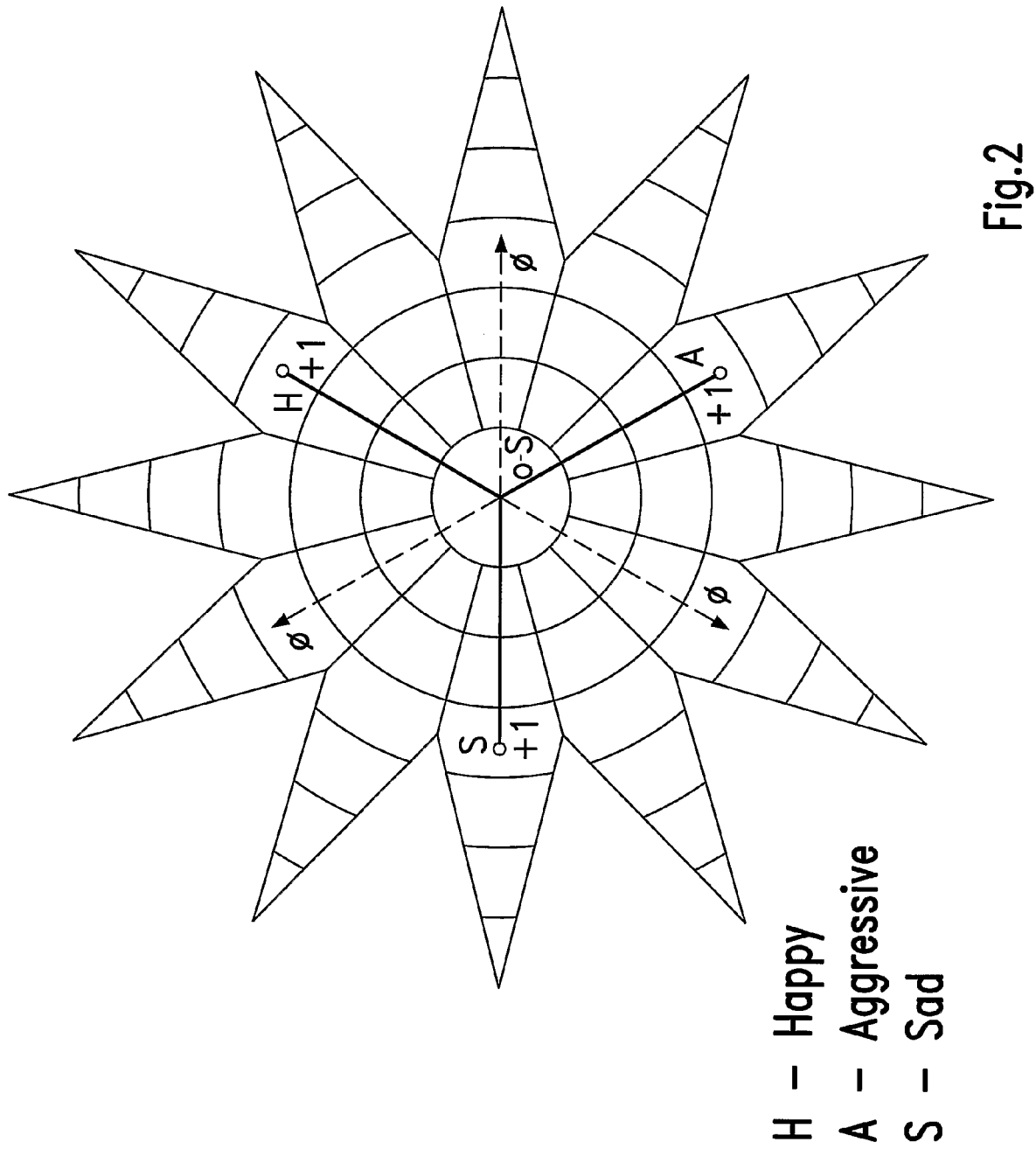
FIGS. 2, 3 are two-dimensional and colored representations for elucidating the basic idea of the two-dimensional and color mapping.
Figure 3:
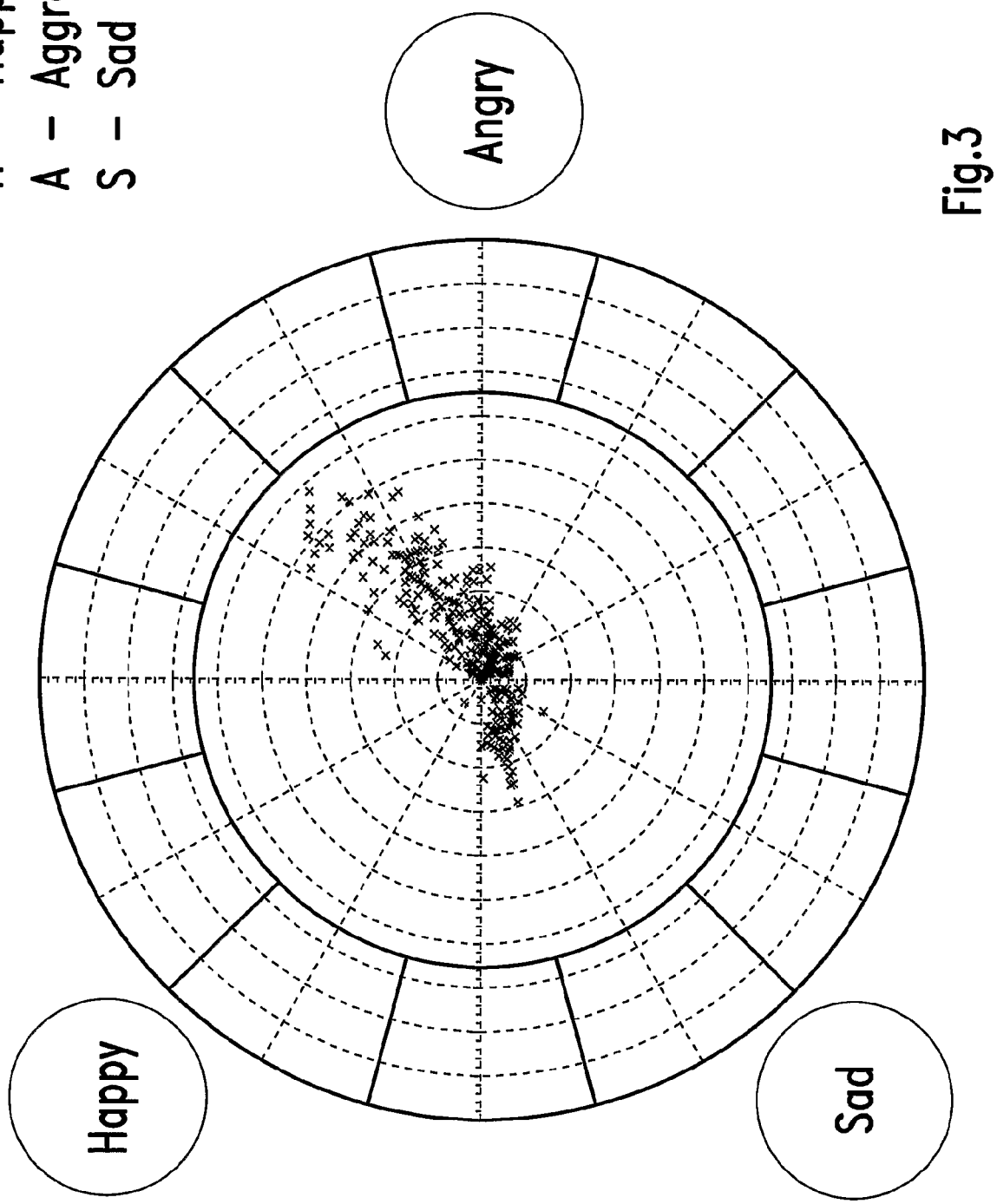

FIGS. 1 and 2 are two-dimensional and colored representations for elucidating the basic idea of the two-dimensional and color mapping.

| Reference Symbols | |
|---|---|
| cj | music class, j = 1, . . . , n |
| cjmin | minimizing music class |
| cs | characteristic class |
| Dj | Gish distance value, j = 1, . . . , n |
| Djmin | minimum Gish distance value |
| MCD | music classification data |
| s | unclassified piece of music to be classified |
| SCD | song classification data |
| Γ | set of music classes |
| Δ | set of Gish distance values |

CITED LITERATURE

[1] Dan Liu, Lie Lu, H. J. Zhang, Automatic Mood Detection from Acoustic Music Data, in Proceedings ISMIR 2003, Baltimore, Md.

[2] George Tzanetakis and Perry Cook, Musical Genre Classification of Audio Signals, in IEEE Transactions on speech and audio processing, Vol 10, No 5, July 2002.

The invention claim is:

1. A method for operating a digital processing apparatus including a processor for classifying music, comprising:
   (a) providing music classification data that are descriptive for a discrete and finite set of a finite number of music classes;
   (b) providing an unclassified piece of music to be classified;
   (c) deriving, in the processor, for each of said music classes of said set of music classes, a respective Gish distance value with respect to said unclassified piece of music to be classified to obtain a discrete and finite set of a finite number of Gish distance values, wherein
   said finite set of a finite number of Gish distance values is descriptive for a relation of said unclassified piece of music to be classified with respect to said discrete and finite set of a finite number of music classes.

2. The method according to claim 1, further comprising:
   (d) detecting, in the processor, within said set of Gish distance values at least one minimum Gish distance value, thereby determining the distinct minimizing music class within the set of music classes that corresponds to said minimum Gish distance value.

3. The method according to claim 2, further comprising:
   (e) selecting said minimizing, in the processing, music class as a characteristic class for said unclassified piece of music to be classified.

4. The method according to claim 1, wherein the Gish distance values are calculated according to equation (1), $$Dj := D(s, cj) \stackrel{def}{=} \log\left(\frac{L(s \mid m(s)) \cdot L(cj \mid m(cj))}{L(s + cj \mid m(s + cj))}\right) \quad (1)$$

where j=1, . . . , n, s denotes the unclassified piece of music to be classified or a part thereof, "+" denotes an operation of concatenation of respective pieces of music, cj for j=1, . . . , n denotes the respective music class or a representative or a part of a representative thereof, m( ) denotes a respective model or model building operation with respect to the respective piece of music, and L(x|y) denotes the likelihood to observe a piece of music, a data set x or a part x thereof when a model y is given.

5. The method according to claim 4, wherein Gaussian density models are used as models m( ).

6. The method according to claim 4, wherein only one single full covariance Gaussian density is employed.

7. The method according to claim 4, wherein multi-variate models are used as models m( ).

8. The method according to claim 1, wherein said providing (a) said music classification data includes,
   receiving or generating, in the processor, said music classification data or a part thereof.

9. The method according to claim 1, wherein said providing (b) an unclassified piece of music to be classified comprises,
   receiving, in the processor, said unclassified piece of music to be classified or a part thereof.

10. The method according to claim 4, wherein said music classification data or models m( ) are based on complete songs or pieces of music or on characteristic parts thereof.

11. The method according to claim 2, wherein said deriving (c) said Gish distance values or said detecting (d) said minimum Gish distance value includes,
   comparing said unclassified piece of music to be classified or a respective part thereof with respect to a plurality or with respect to the entirety of music classes, and
   thereby locating said unclassified piece of music or said respective part thereof within a mood space defined by said music classification data.

12. The method according to claim 1, further comprising:
   (d) providing song classification data that are descriptive for the relation of said unclassified piece of music or a respective part thereof to be classified to said music classes and thereby classifying the unclassified piece of music or the respective part thereof with respect to said music classes.

13. The method according to claim 1, wherein the music piece or a part thereof is sampled.

14. The method according to claim 13, wherein a sampling frequency of about 22 kHz is used.

15. The method according to claim 13, wherein the music piece or the part thereof is cut into frames.

16. The method according to claim 15, wherein a frame length of about 32 ms is used.

17. The method according to claim 15, wherein a frame rate of about 50 ms is used.

18. The method according to claim 15, wherein each frame is Hamming windowed before computation of respective FFTs.

19. The method according to claim 18, wherein
   a respective power spectrum is derived from the respective FFTs, and
   respective power spectral vectors are used as a basis for computation of feature vectors.

20. The method according to claim 19, wherein said feature vectors are melscale warped.

21. The method according to claim 20, wherein 30 melscale coefficients are used.

22. The method according to claim 21, wherein said melscale coefficients are logarithmized.

23. The method according to claim 22, wherein said logarithmized melscale coefficients are subjected to an inverse discrete Fourier transform.

24. The method according to claim 23, wherein from said inverse discrete Fourier transform of said logarithmized melscale coefficients a set of cepstral coefficients per frame is derived.

25. The method according to claim 24, wherein
one or a plurality of spectral centroid, spectral flux, and spectral roll off are computed from said set of cepstral coefficients per frame.

26. The method according to claim 25, wherein one or a plurality of variances of said spectral centroid, of said spectral flux, or of said spectral roll off are computed.

27. The method according to claim 26, wherein said variances of said spectral centroid, of said spectral flux, or of said spectral roll off are computed over a window of Q adjacent frames, Q ranging from 5 to 20.

28. The method according to claim 26, wherein said variances are respectively taken as parameters.

29. The method according to claim 28, wherein
based on said set of Gish distance values music classification data for said piece of music to be classified or for said part thereof are derived, in a form of an n-tuple of at least three numbers.

30. The method according to claim 29, further comprising:
(d) obtaining/providing for a given piece of music to be classified, music classification data in a form of an n-tuple of at least three numbers that are representative of the mood of said piece of music or of said part thereof; and
(e) determining, in the processor, from said n-tuple of numbers of said music classification data a pair of two dimensional coordinate values that are representative of the mood of said piece of music or of said part thereof.

31. A computer program product, arranged or adapted to realize the method for classifying music according to claim 1 when executed on a digital signal processing means or on a computer.

32. A computer readable storage medium, comprising a computer program product according to claim 31.

33. A method for operating a digital processing apparatus including a processor for classifying music, comprising:
(a) obtaining/providing for a given piece of music to be classified, music classification data in a form of an n-tuple of at least 3 numbers that are representative of the mood of said piece of music or of said part thereof; and
(b) determining, in the processor, from said n-tuple of numbers of said music classification data a pair of two dimensional coordinate values that are representative of the mood of said piece of music or of said part thereof.

34. The method according to claim 30, wherein Cartesian coordinates or polar coordinates are used as two-dimensional coordinate values.

35. The method according to claim 30, wherein a triple of numbers is used as said n-tuple of numbers.

36. The method according to claim 35, wherein said triple of numbers is formed by three mood values for said piece of music or said part thereof.

37. The method according to claim 36, wherein said mood values are chosen to classify the moods "happy," "sad," and "aggressive," respectively, with respect to said piece of music or said part thereof.

38. The method according to claim 30, wherein Cartesian coordinates as two-dimensional coordinate values are determined according to:

$$x = j \cdot \cos(\pi/6) - s \cdot \cos(\pi/6) \tag{1a}$$

$$y = a - j \cdot \sin(\pi/6) - s \cdot \sin(\pi/6) \tag{1b}$$

where x and y denote said first and second Cartesian coordinate values respectively, and j, s, and a denote first, second, and third numbers, respectively, of said music classification data for said piece of music or said part thereof, in normalized form and further with respect to the moods "happy," "sad," and "aggressive," respectively.

39. The method according to claim 38, wherein polar coordinates as two-dimensional coordinate values are determined according to $$r = \sqrt{x^2 + y^2} \tag{2a}$$

$$\phi = \frac{1}{2\pi} \cdot \arctan(y/x) \tag{2b}$$

where r and $\phi$ denote the polar radial and the polar angular coordinate values, respectively, and x and y denote two-dimensional Cartesian coordinate values, according to equations (1a), (1b).

40. The method according to claim 39, wherein from two-dimensional coordinate values, in normalized form, a color or color values describing a color are generated which are descriptive of the mood of said piece of music or said part thereof.

41. The method according to claim 40, wherein the color or the color values are determined according to the HSV system.

42. A method according to claim 41, wherein the color or the color values are determined according to the HSV system by $$h = \phi, \tag{3a}$$

$$s = r, \tag{3b}$$

$$v = 1.0, \tag{3c}$$

where h, s, and v denote the HSV color values hue, saturation, and value, respectively, and r and $\phi$ denote the two-dimensional polar radial and polar angular coordinate values, respectively, according to equations (2a), (2b).

43. A system for classifying music, comprising:
means for providing music classification data that are descriptive for a discrete and finite set of a finite number of music classes;
means for providing an unclassified piece of music to be classified;
means for deriving, for each of said music classes of said set of music classes, a respective Gish distance value with respect to said unclassified piece of music to be classified, thereby obtaining a discrete and finite number of Gish distance values, wherein
said finite set of a finite number of Gish distance values is descriptive for a relation of said unclassified piece if music to be classified with respect to said discrete and finite set of a finite number of music classes.

* * * * *